(12) United States Patent
Kawada et al.

(10) Patent No.: US 12,345,852 B2
(45) Date of Patent: Jul. 1, 2025

(54) OPTICAL ELEMENT

(71) Applicant: HAMAMATSU PHOTONICS K.K., Hamamatsu (JP)

(72) Inventors: Yoichi Kawada, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/984,497

(22) Filed: Aug. 4, 2020

(65) Prior Publication Data

US 2021/0041600 A1 Feb. 11, 2021

(30) Foreign Application Priority Data

Aug. 9, 2019 (JP) .................. 2019-147611

(51) Int. Cl.
*G02B 1/118* (2015.01)
(52) U.S. Cl.
CPC .................... *G02B 1/118* (2013.01)
(58) Field of Classification Search
CPC ........... G02B 1/11; G02B 1/111; G02B 1/113; G02B 1/115; G02B 5/281; G02B 5/285; G02B 5/282; G02B 5/289
USPC ....................................... 359/587
See application file for complete search history.

(56) References Cited

U.S. PATENT DOCUMENTS

| 4,583,822 | A | 4/1986 | Southwell |
| 6,627,923 | B1 | 9/2003 | Lipson et al. |
| 7,573,639 | B2 * | 8/2009 | Matsumoto ............ G02B 5/204 359/582 |
| 2006/0001959 | A1 | 1/2006 | Senoue et al. |
| 2007/0258029 | A1 | 11/2007 | Nakagawa et al. |
| 2011/0204463 | A1 * | 8/2011 | Grand ............... H01L 27/14621 257/E31.127 |

(Continued)

FOREIGN PATENT DOCUMENTS

| CN | 103064141 A | 4/2013 |
| CN | 105511004 A | 4/2016 |

(Continued)

OTHER PUBLICATIONS

Hosako (Multilayer optical thin films for use at terahertz frequencies: method of fabrication, Applied Optics vol. 44, No. 18, pp. 3769-3773, 2005). (Year: 2005).*

(Continued)

*Primary Examiner* — Derek S. Chapel
(74) *Attorney, Agent, or Firm* — Faegre Drinker Biddle & Reath LLP

(57) ABSTRACT

An optical element includes a laminate including a first refractive index layer and a second refractive index layer having different refractive index for terahertz waves, wherein the laminate includes a pair layer group in which a plurality of pair layers including the first refractive index layer and the second refractive index layer are laminated, wherein the thickness of the first refractive index layer and the thickness of the second refractive index layer are each smaller than a wavelength of the terahertz waves, and wherein each of the pair layers has a predetermined effective refractive index for the terahertz waves depending on a thickness ratio between the first refractive index layer and the second refractive index layer.

6 Claims, 11 Drawing Sheets

(56) References Cited

U.S. PATENT DOCUMENTS

2021/0341657 A1* 11/2021 Ishikawa ............... G01J 3/0208

FOREIGN PATENT DOCUMENTS

| | | |
|---|---|---|
| CN | 109521504 A | 3/2019 |
| CN | 109975905 A | 7/2019 |
| JP | S59-201003 A | 11/1984 |
| JP | S60-216301 A | 10/1985 |
| JP | H6-160921 A | 6/1994 |
| JP | 2000-150950 A | 5/2000 |
| JP | 2003-107242 A | 4/2003 |
| JP | 2007-322738 A | 12/2007 |
| JP | 2011-221391 A | 11/2011 |
| JP | 2015-172617 A | 10/2015 |
| JP | 2021-028673 A | 2/2021 |
| JP | 7427387 B2 | 2/2024 |

OTHER PUBLICATIONS

Machine translation of CN 109975905 A. (Year: 2019).*
Machine translation of JP 2000-150950 A. (Year: 2000).*
Xu, Gongjie, et al., "0.1-20 THz ultra-broadband perfect absorber via aflatmulti-layer structure," Optics Express , vol. 24, 2016, p. 23177-p. 23185.

* cited by examiner

OPTICAL ELEMENT

TECHNICAL FIELD

The present disclosure relates to an optical element.

BACKGROUND

In recent years, research and development of optical elements that can be used in a terahertz band has been conducted in order to realize various technologies using terahertz waves (electromagnetic waves in the terahertz band). For example, Non-Patent Document 1 (Gongjie Xu, et al., "0.1-20 THz ultra-broadband perfect absorber via a flat multi-layer structure" Optics Express 24, 23177 (2016)) discloses a terahertz wave absorber. Non-Patent Document 1 exemplifies a mode in which an anti-reflection film whose refractive index is adjusted by titanium oxide fine particles or nanoparticles such as hollow polystyrene spheres is provided on a highly doped silicon substrate.

SUMMARY

Examples of optical elements include various elements such as a lens, a polarizer, a spectrometer, and a sensor in addition to the above absorber. In constructing an optical element that can be used in the terahertz band, adjustment of a refractive index for terahertz waves is an important technical matter. In Non-Patent Document 1, a terahertz wave absorber is produced by controlling the concentration of nanoparticles dispersed in a resin to form arbitrary refractive index layers, and laminating the layers in order from the refractive index layer having the highest concentration of nanoparticles. However, in such a method, since it is necessary to produce a composite having a plurality of concentrations corresponding to respective refractive index layers, there is a problem that a process of producing an optical element is complicated.

The present disclosure has been made in order to address the above problem, and an object of the present disclosure is to provide an optical element which is easy to produce and of which a refractive index for terahertz waves is easily adjusted.

In order to address the above problem, the inventors focused on the relationship between the wavelength of light and the thicknesses of layers constituting the optical element in the course of extensive studies. Then, it was found that, when the thickness of the layers constituting the optical element is sufficiently smaller than the wavelength of terahertz waves, the layers do not have sensitivity with respect to the terahertz waves. In a visible light wavelength band, in order to make the thickness of the layers constituting the optical element sufficiently smaller than the wavelength of light, the thickness of the layer needs to be, for example, 1 nm or less, and the method of producing such layers is very limited. In addition, in the visible light region, there are many options for optical elements without considering the relationship between the wavelength of light and the thickness of the layer. On the other hand, the wavelength band of terahertz waves has longer wavelengths than the wavelength band of visible light, and the thickness of the layer constituting the optical element can be made sufficiently smaller than the wavelength of light. Therefore, the inventors found that, when layers having no sensitivity with respect to terahertz waves are combined, it is possible to realize an optical element which is easy to produce and of which a refractive index for terahertz waves is easily adjusted, and completed the present invention.

An optical element according to an aspect of the present disclosure includes a laminate including a first refractive index layer and a second refractive index layer having different refractive indexes for terahertz waves, wherein the laminate includes a pair layer group in which a plurality of pair layers including the first refractive index layer and the second refractive index layer are laminated, wherein the thickness of the first refractive index layer and the thickness of the second refractive index layer are each smaller than a wavelength of the terahertz waves, and wherein each of the pair layers has a predetermined effective refractive index for the terahertz waves depending on a thickness ratio between the first refractive index layer and the second refractive index layer.

In this optical element, the first refractive index layer and the second refractive index layer each have a thickness smaller than the wavelength of terahertz waves. Therefore, the first refractive index layer and the second refractive index layer do not have sensitivity with respect to terahertz waves, and the effective refractive index of the pair layer including the first refractive index layer and the second refractive index layer can be a value between the refractive index of the first refractive index layer and the refractive index of the second refractive index layer depending on the thickness ratio between these layers. Therefore, in this optical element, when a ratio between the thickness of the first refractive index layer and the thickness of the second refractive index layer in the pair layer is adjusted, it is possible to easily adjust the effective refractive index for terahertz waves to a desired value. In addition, in this optical element, since a desired refractive index can be obtained using only two types of refractive index layers having different refractive indexes, production is easier compared to when a composite having a plurality of concentrations corresponding to respective refractive index layers is produced.

The optical element may further include a main body part configured to support the laminate, and in the pair layer group, the effective refractive index of the pair layer for the terahertz waves may approach a refractive index of the main body part for the terahertz waves as the pair layer becomes closer to the main body part. In this case, a pseudo moth-eye structure can be formed in the main body part. Therefore, an anti-reflection structure having a wide band for terahertz waves can be formed in the main body part. Since the structure is formed using only two types of refractive index layers, it is possible to maintain ease of production.

The optical element may further include a main body part configured to support the laminate, and in the pair layer group, the effective refractive indexes of the pair layers for terahertz waves may be equal to each other. In this case, an anti-reflection structure similar to that of a single-layer anti-reflection film can be formed in the main body part. Since the structure is formed using only two types of refractive index layers, it is possible to maintain ease of production.

The optical element may further include a main body part configured to support the laminate, and in the laminate, a first pair layer group having a first effective refractive index for terahertz waves and a second pair layer group having a second effective refractive index for terahertz waves may be alternately laminated. In this case, the same structure as that of a dielectric multilayer film can be formed in the main body part. Since the structure is formed using only two types of refractive index layers, it is possible to maintain ease of production.

In the laminate, a plurality of pair layer groups having different effective refractive indexes for terahertz waves may be distributed in a direction intersecting a lamination direction of the pair layers. In this case, regions having different effective refractive indexes can be distributed in any region in a direction intersecting the lamination direction of the pair layers. Since the refractive index distribution is formed using only two types of refractive index layers, it is possible to maintain ease of production.

The thickness of the first refractive index layer and the thickness of the second refractive index layer may each be 1/10 or less of the wavelength of terahertz waves. In this case, it is possible to sufficiently reduce sensitivity with respect to terahertz waves of the first refractive index layer and the second refractive index layer. Therefore, the effective refractive index of the pair layer can accurately approach a target value.

The thickness of the first refractive index layer and the thickness of the second refractive index layer may each be 1/100 or less of the wavelength of terahertz waves. In this case, it is possible to further sufficiently reduce sensitivity with respect to terahertz waves of the first refractive index layer and the second refractive index layer. Therefore, the effective refractive index of the pair layer can be more accurately approach a target value.

According to the present disclosure, it is possible to provide an optical element which is easy to produce and of which a refractive index for terahertz waves is easily adjusted.

DETAILED DESCRIPTION

Hereinafter, preferable embodiments of optical elements according to aspects of the present disclosure will be described in detail with reference to the drawings.

First Embodiment

Figure 1:
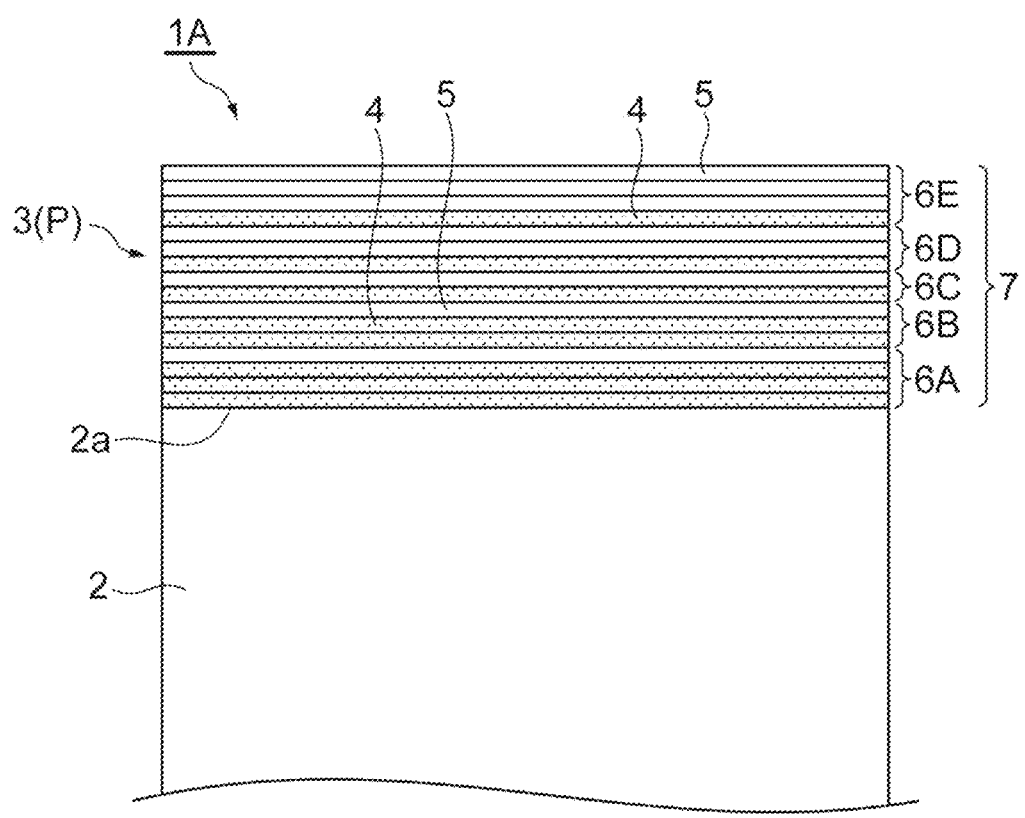
FIG. 1 is a schematic cross-sectional view showing a layer configuration of an optical element according to a first embodiment.

FIG. 1 is a schematic cross-sectional view showing a layer configuration of an optical element according to a first embodiment. The optical element according to the first embodiment is an element used for electromagnetic waves in a terahertz band (hereinafter referred to as "terahertz waves"). Examples of such optical elements include a lens, a polarizer, a spectrometer, an absorber, and various sensors. In the following description, an element on which an anti-reflection film is provided will be exemplified as the optical element. In addition, the frequency of the terahertz waves applied to the optical element is, for example, 0.1 THz to 10 THz. The wavelength of the terahertz waves in this band is 30 μm to 3000 μm.

As shown in FIG. 1, an optical element 1A includes a main body part 2 and an anti-reflection film 3 provided on the surface of the main body part 2. The main body part 2 has a main surface 2a positioned on the side of the anti-reflection film 3 in the thickness direction. In the optical element 1A, the main surface 2a is an incident surface on which terahertz waves are incident. The main body part 2 may be a member that transmits terahertz waves or a member that converts terahertz waves into an electrical signal. When the main body part 2 is a sensor that detects terahertz waves, in the main body part 2, an amplification circuit configured to amplify an electrical signal output from a light receiving unit, various wirings, a connection terminal for an external device, and the like are provided in addition to a terahertz wave light receiving unit.

In the present embodiment, the main body part 2 is a member that transmits terahertz waves. Specifically, the main body part 2 is a single crystal silicon substrate having excellent transmittance for terahertz waves. At least a part of the silicon substrate may be doped with impurities. At least a part of the main surface 2a is made of silicon. The main surface 2a is not limited to a surface formed of only silicon, and may include a metal surface that functions as a part of a wiring or the like.

The anti-reflection film 3 is a film that prevents or minimizes reflection of terahertz waves on the surface of the main body part 2. As shown in FIG. 1, the anti-reflection film 3 is composed of a laminate P including a first refractive index layer 4 and a second refractive index layer 5 which have different refractive indexes for terahertz waves. The laminate P has a pair layer group 7 in which a plurality of pair layers 6 including the first refractive index layer 4 and the second refractive index layer 5 are laminated.

For example, the first refractive index layer 4 and the second refractive index layer 5 are layers made of an organic resin containing inorganic particles. For example, the organic resin is a resin composed of only a cycloolefin polymer or a resin containing a cycloolefin polymer as a main component. In the present embodiment, the organic resin is a resin containing a cycloolefin polymer as a main component, and may contain a high-molecular-weight organic compound, a low-molecular-weight organic compound or the like other than the cycloolefin polymer. The organic resin may contain a cross-linking agent, a polymerization initiator, and the like. In addition, the organic resin may contain an inorganic substance other than the inorganic particles.

The inorganic particles are particles used for adjusting a refractive index of the anti-reflection film 3 and are dispersed in the organic resin. For example, the inorganic particles are composed of a substance having transmittance for terahertz waves. In addition, the inorganic particles are composed of a substance having a higher refractive index for terahertz waves than the organic resin. Therefore, when the concentration of inorganic particles dispersed in the organic resin increases, the refractive index for terahertz waves increases, and when the concentration of inorganic particles dispersed in the organic resin decreases, the refractive index for terahertz waves decreases.

Examples of inorganic particles include silicon particles, titanium oxide particles, and diamond particles. The silicon particles may be high resistance silicon particles. For example, the high resistance silicon particles may be silicon particles having a resistance value of $1\times10^3$ Ω·cm or more. The average diameter of the inorganic particles is, for example, 5 nm or more and 3,000 nm or less. The upper limit of the average diameter of the inorganic particles may be 1 μm, 200 nm, or 20 nm. In addition, the lower limit of the average diameter of the inorganic particles may be 200 nm, 20 nm, or 1 nm. The average diameter of the inorganic particles can be measured by, for example, a laser diffraction/scattering method, a dynamic light scattering method, a photon correlation method, or the like.

In the present embodiment, the concentration of inorganic particles dispersed in the organic resin in the first refractive index layer 4 is higher than the concentration of inorganic particles dispersed in the organic resin in the second refractive index layer 5. That is, in the present embodiment, the first refractive index layer 4 is a high refractive index layer having a higher refractive index for terahertz waves than the second refractive index layer 5, and the second refractive index layer 5 is a low refractive index layer having a lower refractive index for terahertz waves than the first refractive index layer 4. Here, the second refractive index layer 5 as a low refractive index layer may be composed of only an organic resin without inorganic particles being dispersed therein.

In the pair layer 6 including the first refractive index layer 4 and the second refractive index layer 5, the first refractive index layer 4 and the second refractive index layer 5 are laminated at a predetermined thickness ratio. The thicknesses of the first refractive index layer 4 and the second refractive index layer 5 are each smaller than the wavelength of terahertz waves incident on the optical element 1A. The thicknesses of the first refractive index layer 4 and the second refractive index layer 5 are, for example, 1/10 or less, of the wavelength of terahertz waves, and preferably 1/100 or less.

When the thicknesses of the first refractive index layer 4 and the second refractive index layer 5 are sufficiently smaller than the wavelength of terahertz waves, the first refractive index layer 4 and the second refractive index layer 5 do not have sensitivity with respect to terahertz waves. In this case, the first refractive index layer 4 and the second refractive index layer 5 do not constitute two independent layers having refractive indexes for terahertz waves, and the refractive index for terahertz waves (hereinafter referred to as an "effective refractive index") of the pair layer 6 including the first refractive index layer 4 and the second refractive index layer 5 can be a value between the refractive index of the first refractive index layer 4 and the refractive index of the second refractive index layer 5 depending on the thickness ratio between these layers.

In the present embodiment, as shown in FIG. 1, a pair layer 6A, a pair layer 6B, a pair layer 6C, a pair layer 6D, and a pair layer 6E are laminated in order from the side closer to the main body part 2. A thickness ratio between the first refractive index layer 4 and the second refractive index layer 5 is 3:1 in the pair layer 6A, 2:1 in the pair layer 6B, 1:1 in the pair layer 6C, 1:2 in the pair layer 6D, and 1:3 in the pair layer 6E. That is, a ratio of the high refractive index layer to the low refractive index layer becomes higher as the pair layer 6 becomes closer to the main body part 2 in the pair layer group 7. In such a configuration, in the pair layer group 7, the effective refractive index of the pair layer 6 for terahertz waves gradually approaches the refractive index of the main body part 2 for terahertz waves as the pair layer 6 becomes closer to the main body part 2.

Adjustment of the thicknesses of the first refractive index layer 4 and the second refractive index layer 5 in each pair layer 6 can be performed when the first refractive index layer 4 and the second refractive index layer 5 are applied and formed, for example, using an airbrush. When an airbrush is used, for example, the airbrush in one direction within the main surface 2a in the main body part 2 is moved at a predetermined speed, and thus a thin film made of a resin material is applied. When the thin film is repeatedly applied, the refractive index layer can be formed to have an arbitrary thickness. For example, when the thickness of the thin film formed by one application using an airbrush is 100 nm, a refractive index layer with a thickness of 15 μm can be formed by repeating application of the thin film 150 times. Here, the adjustment of the thickness of the refractive index layer can be controlled by a moving speed of the airbrush. For example, the speed of the airbrush may be decreased when a thick refractive index layer is formed, and the speed of the airbrush may be increased when a thin refractive index layer is formed.

As described above, in the optical element 1A, the first refractive index layer 4 and the second refractive index layer 5 each have a thickness smaller than the wavelength of terahertz waves. Therefore, the first refractive index layer 4 and the second refractive index layer 5 do not have sensitivity with respect to terahertz waves, and the effective refractive index of the pair layer 6 including the first refractive index layer 4 and the second refractive index layer 5 can be a value between the refractive index of the first refractive index layer 4 and the refractive index of the second refractive index layer 5 depending on the thickness ratio between these layers. Therefore, in the optical element 1A, when a ratio between the thickness of the first refractive index layer 4 and the thickness of the second refractive index layer 5 in the pair layer 6 is adjusted, it is possible to easily adjust the effective refractive index for terahertz waves to a desired value. In addition, in the optical element 1A, since a desired refractive index can be obtained using only two types of refractive index layers having different refractive indexes, production is easier compared to when a composite having a plurality of concentrations corresponding to respective refractive index layers is produced.

In addition, the optical element 1A has the main body part 2 that supports the laminate P, and in the pair layer group 7, the effective refractive index of the pair layer 6 for terahertz waves gradually approaches the refractive index of the main body part 2 for terahertz waves as the pair layer 6 becomes closer to the main body part 2. Thereby, a pseudo moth-eye structure can be formed in the main body part 2. Therefore, an anti-reflection structure having a wide band for terahertz waves can be formed in the main body part 2. Since the structure is formed using only two types of refractive index layers as described above, it is possible to maintain ease of production.

In addition, in the optical element 1A, the thickness of the first refractive index layer 4 and the thickness of the second refractive index layer 5 are each $1/10$ or less of the wavelength of terahertz waves and preferably $1/100$ or less. Thereby, it is possible to sufficiently reduce the sensitivity with respect to terahertz waves of the first refractive index layer 4 and the second refractive index layer 5. Therefore, the effective refractive index of the pair layer 6 can accurately approach a target value.

Here, the pair layer 6 is preferably formed using only two types of refractive index layers including the first refractive index layer 4 and the second refractive index layer 5, but one or more other refractive index layers may be included in a range in which the effective refractive index of the pair layer 6 for terahertz waves can be adjusted.

Second Embodiment

Figure 2:
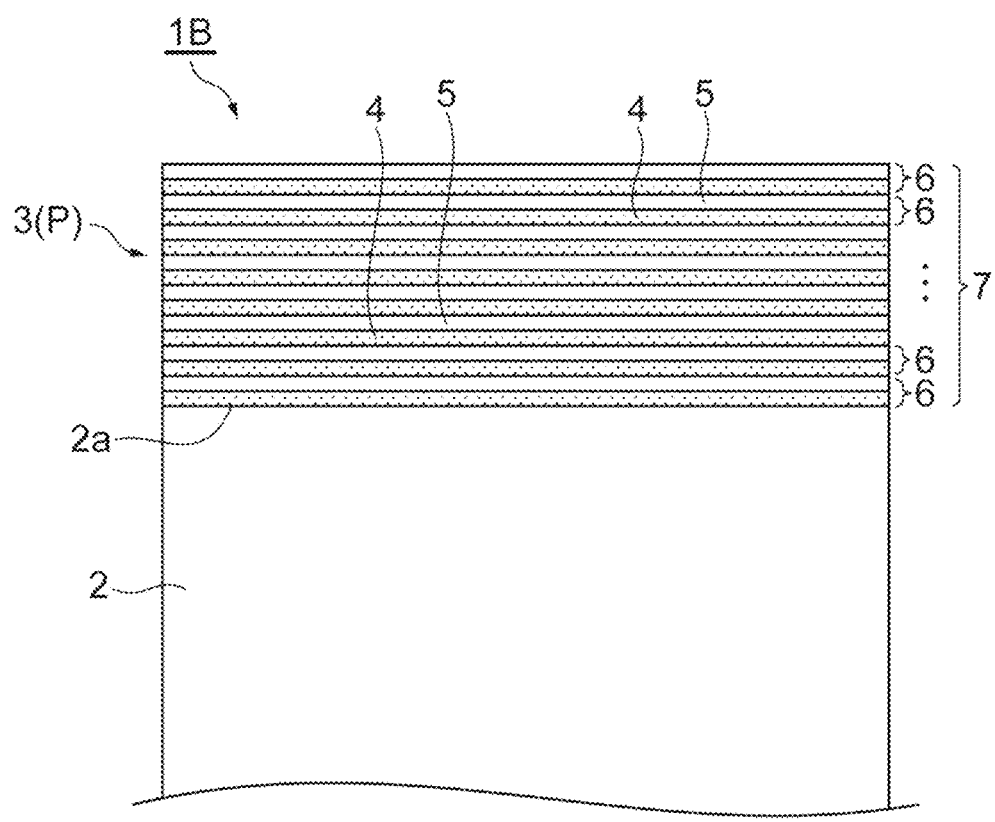
FIG. 2 is a schematic cross-sectional view showing a layer configuration of an optical element according to a second embodiment.

FIG. 2 is a schematic cross-sectional view showing a layer configuration of an optical element according to a second embodiment. An optical element 1B according to the second embodiment is different from the optical element 1A according to the first embodiment in the layer structure of the laminate constituting the anti-reflection film 3. Specifically, in the optical element 1B, as shown in FIG. 2, in all pair layers 6 constituting the pair layer group 7, the thickness ratio between the first refractive index layer 4 and the second refractive index layer 5 is 1:1. That is, in the optical element 1B, in the pair layer group 7, the effective refractive indexes of the pair layers 6 for terahertz waves are equal to each other. The thickness of the first refractive index layer 4 and the thickness of the second refractive index layer 5 are each $1/10$ or less of the wavelength of terahertz waves and preferably $1/100$ or less, which is the same as in the first embodiment.

The anti-reflection film 3 is similar to the anti-reflection film 3 of the first embodiment in that it has an anti-reflection function for terahertz waves, but the antireflection principle is different. The anti-reflection film 3 of the first embodiment realizes an anti-reflection structure having a wide band according to a pseudo moth-eye structure. On the other hand, the anti-reflection film 3 of the second embodiment realizes an anti-reflection structure having a narrow band, like a so-called single-layer anti-reflection film. The anti-reflection film 3 is formed when the effective refractive index of each pair layer 6 is $\sqrt{n}$ if the refractive index of the main body part 2 for terahertz waves is set as n, and when the thickness of the laminate P (the pair layer group 7) in the lamination direction is $1/4$ of the wavelength of terahertz waves. In this case, since a reflection component reflected at an interface between the laminate P and air and a reflection component reflected at an interface between the laminate P and the main body part 2 are cancelled out, it is possible to prevent reflection of terahertz waves with a wavelength determined according to the thickness of the laminate P in the lamination direction in a pinpoint manner.

Also in the optical element 1B, when a ratio between the thickness of the first refractive index layer 4 and the thickness of the second refractive index layer 5 in the pair layer 6 is adjusted, it is possible to easily adjust the effective refractive index for terahertz waves to a desired value. In addition, also in the optical element 1B, since a desired refractive index can be obtained using only two types of refractive index layers having different refractive indexes, production is easier compared to when a composite having a plurality of concentrations corresponding to respective refractive index layers is produced.

In the optical element 1B, in the pair layer group 7, the effective refractive indexes of the pair layers 6 for terahertz waves are equal to each other. Thereby, an anti-reflection structure similar to that of a single-layer anti-reflection film can be formed in the main body part 2. Since the structure is formed using only two types of refractive index layers, it is possible to maintain ease of production.

In addition, also in the optical element 1B, the thickness of the first refractive index layer 4 and the thickness of the second refractive index layer 5 are each $1/10$ or less of the wavelength of terahertz waves, and preferably $1/100$ or less. Thereby, it is possible to sufficiently reduce the sensitivity with respect to terahertz waves of the first refractive index layer 4 and the second refractive index layer 5. Therefore, the effective refractive index of the pair layer 6 can accurately approach a target value.

Third Embodiment

Figure 3:
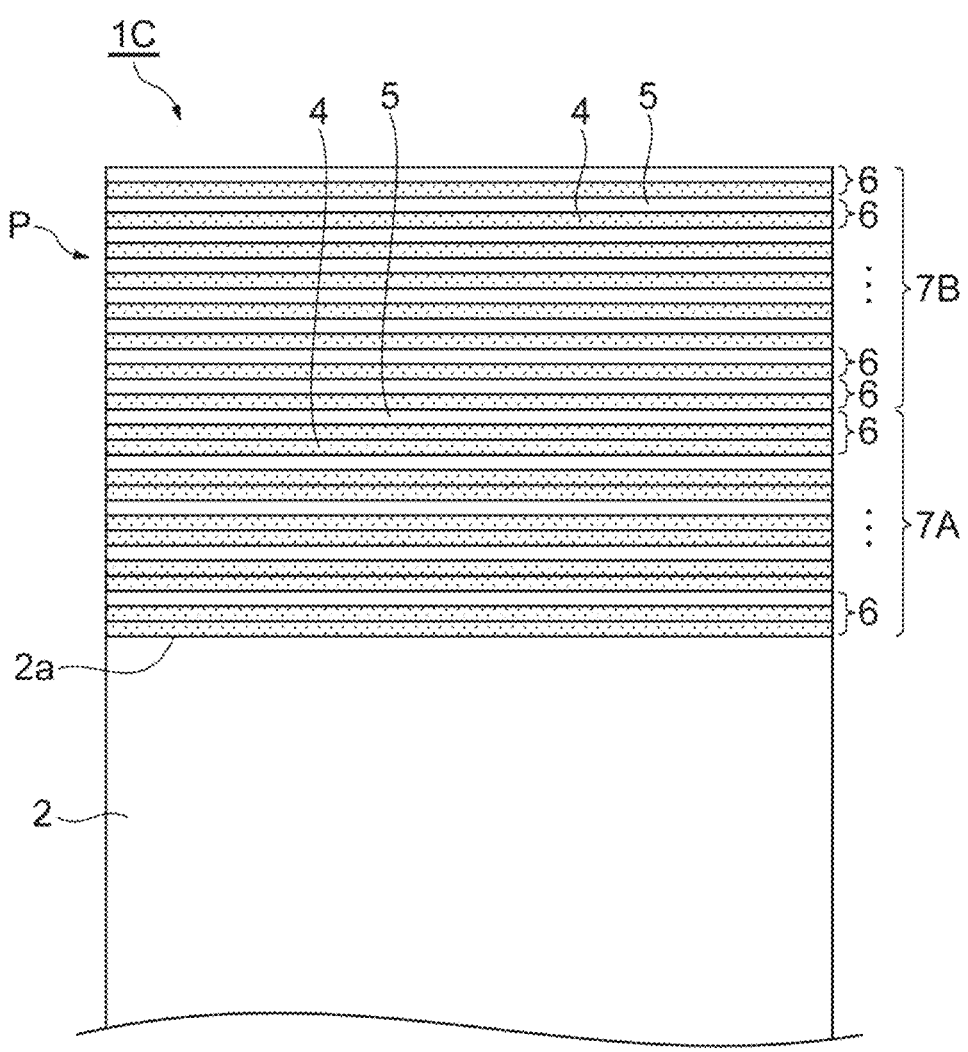
FIG. 3 is a schematic cross-sectional view showing a layer configuration of an optical element according to a third embodiment.

FIG. 3 is a schematic cross-sectional view showing a layer configuration of an optical element according to a third embodiment. In an optical element 1C shown in FIG. 3, the laminate P includes a first pair layer group 7A and a second pair layer group 7B. The first pair layer group 7A has a first effective refractive index for terahertz waves. The second pair layer group 7B has a second effective refractive index for terahertz waves. In the example in FIG. 3, the first pair layer group 7A and the second pair layer group 7B are laminated in order from the side closer to the main body part 2.

In the first pair layer group 7A, a thickness ratio between the first refractive index layer 4 and the second refractive index layer 5 constituting the pair layer 6 is 2:1. In the second pair layer group 7B, a thickness ratio between the first refractive index layer 4 and the second refractive index layer 5 constituting the pair layer 6 is 1:1. Therefore, in the optical element 1C, the high refractive index layer formed by the first pair layer group is positioned on the side closer to the main body part 2, and the low refractive index layer formed by the second pair layer group 7B is positioned on the side farther from the main body part 2. In the optical element 1C, an anti-reflection structure having a wider band than that of the above second embodiment can be realized.

Also in the optical element 1C, when a ratio between the thickness of the first refractive index layer 4 and the thickness of the second refractive index layer 5 in the pair layer 6 is adjusted, it is possible to easily adjust the effective refractive index for terahertz waves to a desired value. In addition, also in the optical element 1C, since a desired refractive index can be obtained using only two types of refractive index layers having different refractive indexes, production is easier compared to when a composite having a plurality of concentrations corresponding to respective refractive index layers is produced.

In addition, also in the optical element 1C, the thickness of the first refractive index layer 4 and the thickness of the second refractive index layer 5 are each $1/10$ or less of the wavelength of terahertz waves and preferably $1/100$ or less. Thereby, it is possible to sufficiently reduce the sensitivity with respect to terahertz waves of the first refractive index layer 4 and the second refractive index layer 5. Therefore, the effective refractive index of the pair layer 6 can accurately approach a target value.

Here, while the laminate P is formed of two pair layer groups having different effective refractive indexes in this embodiment, the laminate P may be formed of three or more pair layer groups having different effective refractive indexes. When the laminate P is formed of three or more pair layer groups having different effective refractive indexes, the pair layer groups may be arranged so that the effective refractive index gradually approaches the refractive index of the main body part 2 as the pair layer group is closer to the main body part 2.

Fourth Embodiment

Figure 4:
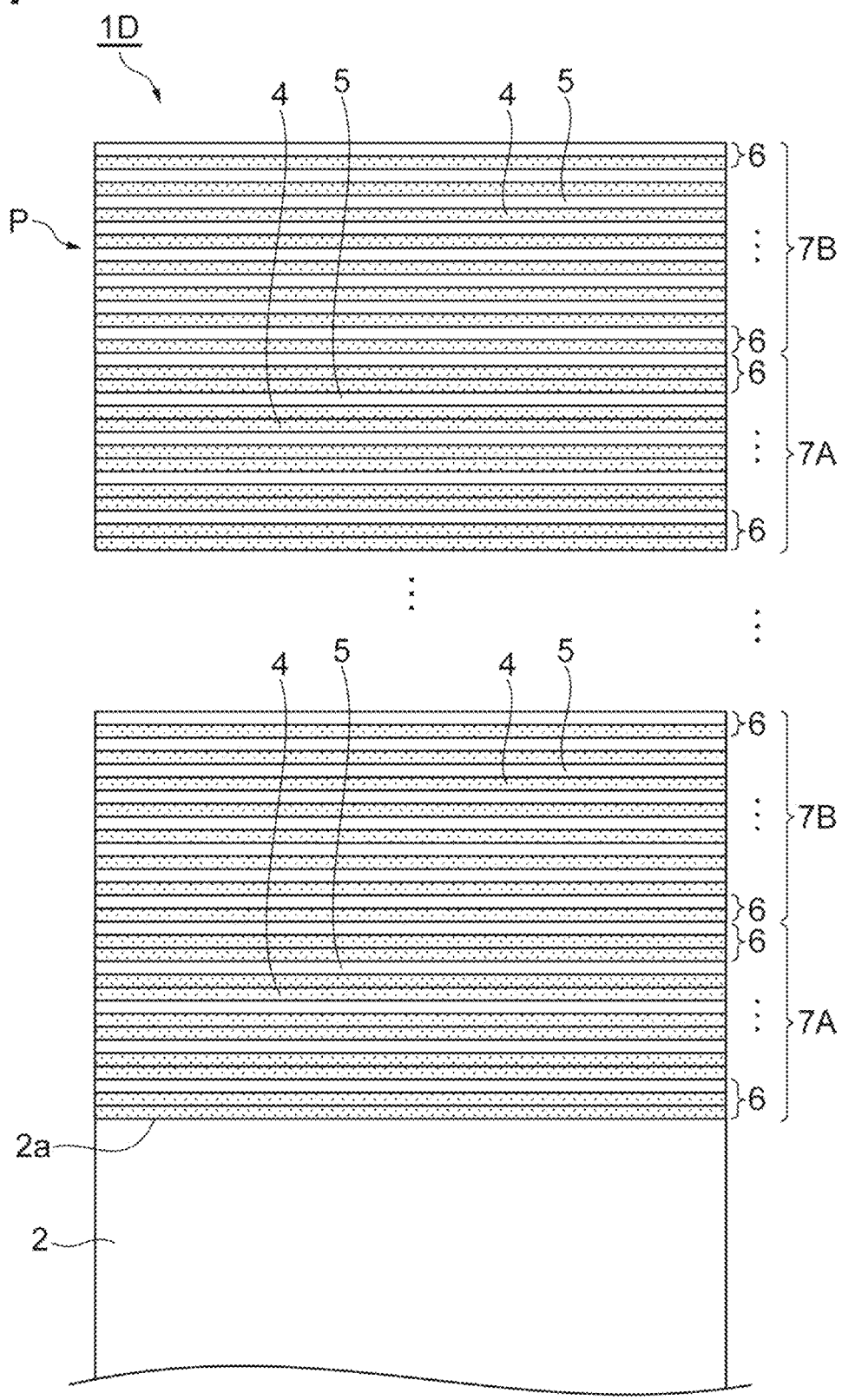
FIG. 4 is a schematic cross-sectional view showing a layer configuration of an optical element according to a fourth embodiment.

FIG. 4 is a schematic cross-sectional view showing a layer configuration of an optical element according to a fourth embodiment. An optical element 1D shown in FIG. 4 is different from the third embodiment in that a plurality of first pair layer groups 7A and second pair layer groups 7B are alternately laminated in the laminate P. That is, in the optical element 1D, the first pair layer group as high refractive index layers and the second pair layer group 7B as low refractive index layers are alternately positioned in the lamination direction of the laminate P.

Also in the optical element 1D, when a ratio between the thickness of the first refractive index layer 4 and the thickness of the second refractive index layer 5 in the pair layer 6 is adjusted, it is possible to easily adjust the effective refractive index for terahertz waves to a desired value. In addition, also in the optical element 1D, since a desired refractive index can be obtained using only two types of refractive index layers having different refractive indexes, production is easier compared to when a composite having a plurality of concentrations corresponding to respective refractive index layers is produced.

In the optical element 1D, in the laminate P, the first pair layer group 7A having a first effective refractive index for terahertz waves and the second pair layer group 7B having a second effective refractive index for terahertz waves are alternately laminated. Thereby, the same structure as that of a dielectric multilayer film in which the high refractive index layer and the low refractive index layer are alternately laminated can be formed in the main body part 2. Since the structure is formed using only two types of refractive index layers, it is possible to maintain ease of production.

In addition, also in the optical element 1D, the thickness of the first refractive index layer 4 and the thickness of the second refractive index layer 5 are each $1/10$ or less of the wavelength of terahertz waves, and preferably $1/100$ or less. Thereby, it is possible to sufficiently reduce the sensitivity with respect to terahertz waves of the first refractive index layer 4 and the second refractive index layer 5. Therefore, the effective refractive index of the pair layer 6 can accurately approach a target value.

Here, while the laminate P is formed by alternately laminating two pair layer groups having different effective refractive indexes in this embodiment, the laminate P may be formed by repeatedly laminating three or more pair layer groups having different effective refractive indexes in the order of a higher effective refractive index.

Fifth Embodiment

Figure 5:
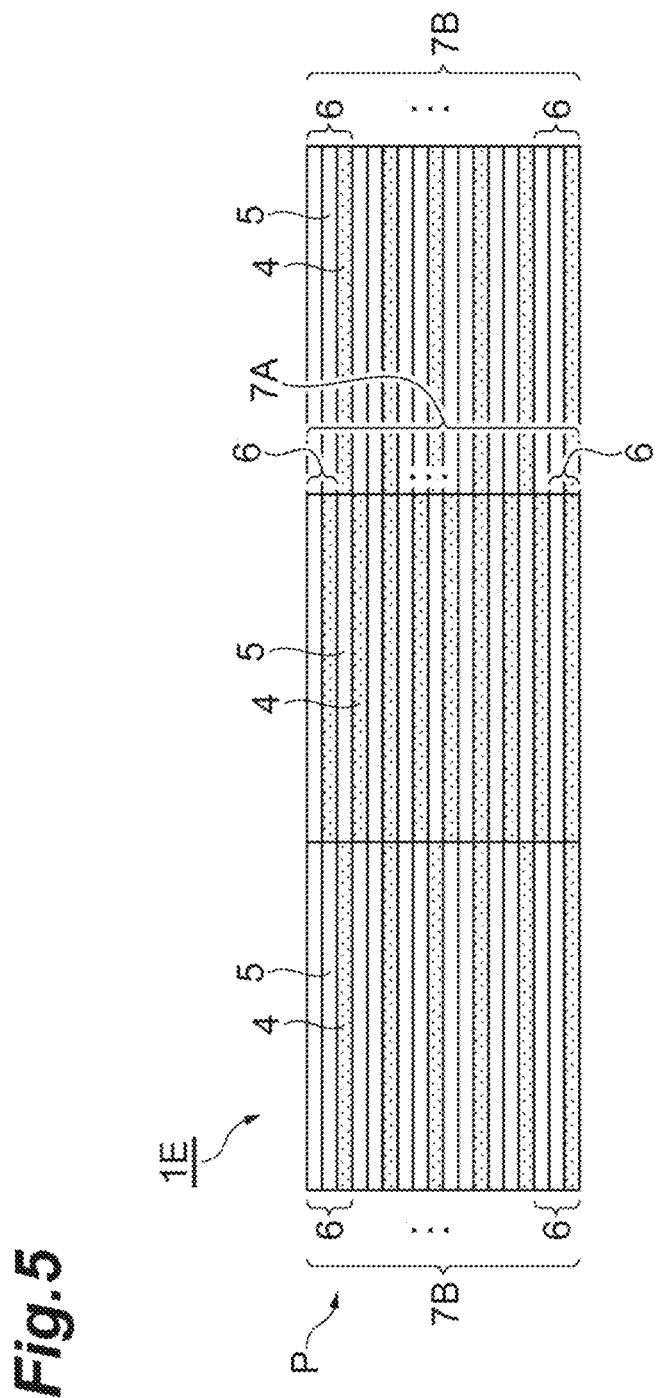
FIG. 5 is a schematic cross-sectional view showing a layer configuration of an optical element according to a fifth embodiment.

FIG. 5 is a schematic cross-sectional view showing a layer configuration of an optical element according to a fifth embodiment. In an optical element 1E according to the fifth embodiment, in the laminate P, a plurality of pair layer groups 7 having different effective refractive indexes for terahertz waves are distributed in a direction intersecting the lamination direction of the pair layers 6. In the example in FIG. 5, the optical element 1E does not have the main body part 2 and is composed of only the laminate P. The laminate P has a circular shape as a whole in a plan view. The first pair layer group 7A having a circular shape in a plan view is arranged in the central part of the laminate P, and the second pair layer group 7B having a ring shape in a plan view is arranged in the outer edge part of the laminate P so that it surrounds the first pair layer group 7A.

In the first pair layer group 7A, a thickness ratio between the first refractive index layer 4 and the second refractive index layer 5 constituting the pair layer 6 is 1:1. In the second pair layer group 7B, a thickness ratio between the first refractive index layer 4 and the second refractive index layer 5 constituting the pair layer 6 is 1:2. Therefore, in the optical element 1E, a high refractive index layer having a circular shape formed of the first pair layer group 7A is positioned in the central part of the laminate P, and a low refractive index layer having a ring shape formed of the second pair layer group 7B is positioned around the high refractive index layer.

Also in the optical element 1E, when a ratio between the thickness of the first refractive index layer 4 and the thickness of the second refractive index layer 5 in the pair layer 6 is adjusted, it is possible to easily adjust the effective refractive index for terahertz waves to a desired value. In addition, also in the optical element 1E, since a desired refractive index can be obtained using only two types of refractive index layers having different refractive indexes, production is easier compared to when a composite having a plurality of concentrations corresponding to respective refractive index layers is produced.

In the optical element 1E, in the laminate P, a plurality of pair layer groups 7 having different effective refractive indexes for terahertz waves are distributed in a direction intersecting the lamination direction of the pair layers 6. Thereby, regions having different effective refractive indexes can be distributed in any region in a direction intersecting the lamination direction of the pair layers. In the present embodiment, the effective refractive index of the peripheral part is lower than that of the central part of the laminate P. Therefore, in the present embodiment, for example, it is possible to construct a gradient-index lens that refracts terahertz waves in the laminate P in a parabolic shape. Since the refractive index distribution is formed using only two types of refractive index layers, it is possible to maintain ease of production.

Here, also in this embodiment, three or more pair layer groups having different effective refractive indexes may be distributed in any region in a direction intersecting the lamination direction of the pair layers 6. In addition, the shape of a distribution is not limited to a circular shape and a ring shape, and other shapes such as a rectangular shape, a lattice shape, and a radial shape can be used. According to the distribution shape of the pair layer groups, propagation of terahertz waves in the laminate can be controlled. Therefore, in addition to the above gradient-index lens, application to a waveguide, an optical cloaking material, a hyper lens, and the like is possible.

Modified Example

While a single crystal silicon substrate has been exemplified as the main body part 2 in the above embodiment, the material forming the main body part 2 is not limited thereto. The main body part 2 may be formed of an optical material, for example, germanium or diamond. In addition, the main body part 2 may be formed of an optical crystal such as zinc telluride (ZnTe), lithium niobate (LiNbO3), and DAST (4-dimethylamino-N-methyl-4-stilbazolium tosylate).

Examination About the Relationship Between the Wavelength of Terahertz Waves and the Thickness of the Refractive Index Layer Hereinafter, the relationship between the wavelength of terahertz waves and the thickness of the refractive index layer will be examined. Here, conditions in which the first refractive index layer and the second refractive index layer do not have sensitivity with respect to terahertz waves are examined. That is, conditions in which the effective refractive index of the pair layer has a value between the refractive index of the first refractive index layer and the refractive index of the second refractive index layer, and the pair layer functions as an intermediate refractive index layer between the first refractive index layer and the second refractive index layer will be described.

Figure 6:
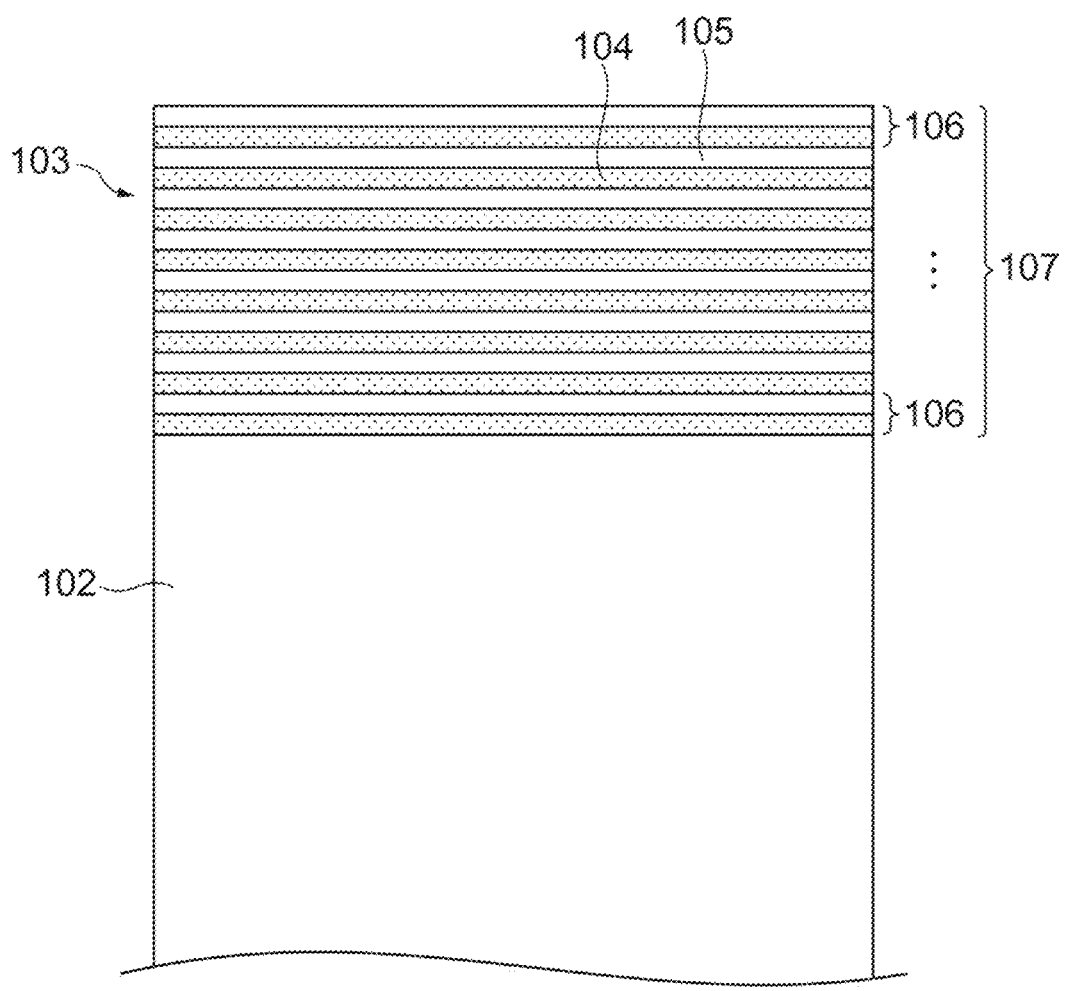
FIG. 6 is a schematic cross-sectional view showing a layer structure of an optical element using a simulation.

FIG. 6 is a schematic cross-sectional view showing a layer structure of an optical element using a simulation. As shown in FIG. 6, in this simulation, an anti-reflection film 103 formed on a main body part 102, which is a silicon substrate, is used as a model. The anti-reflection film 103 is formed of a pair layer group 107 in which pair layers 106 including a first refractive index layer 104 and a second refractive index layer 105 are laminated. Regarding the refractive index n1 of the first refractive index layer 104 and the refractive index n2 of the second refractive index layer 105, three patterns are prepared. In the pattern 1, n1=1.5, and n2=2.5. In the pattern 2, n1=1.8, and n2=2.2. In the pattern 3, n1=2.0, and n2=2.0. The pattern 1 has a larger refractive index difference between the first refractive index layer 104 and the second refractive index layer 105 than the pattern 2. In the pattern 3, n1 and n2 are equal to each other. The pattern 3 is equivalent to the anti-reflection film formed of a single refractive index layer and is a reference for this simulation.

The frequency of terahertz waves is in a range of 0.1 THz to 100 THz. This range is 3 µm to 3,000 µm in terms of wavelength. The layer thicknesses of the first refractive index layer 104 and the second refractive index layer 105, which are variables in the simulation, are four levels: 100 nm, 250 nm, 500 nm, and 1,000 nm. In order to make anti-reflective properties uniform, the thickness of the pair layer group 107 is set to 20 µm regardless of the layer thicknesses of the first refractive index layer 104 and the second refractive index layer 105. Therefore, the number of layers of the pair layer 106 constituting the pair layer group 107 differs depending on the layer thickness of the first refractive index layer 104 and the second refractive index layer 105.

Figure 8A:
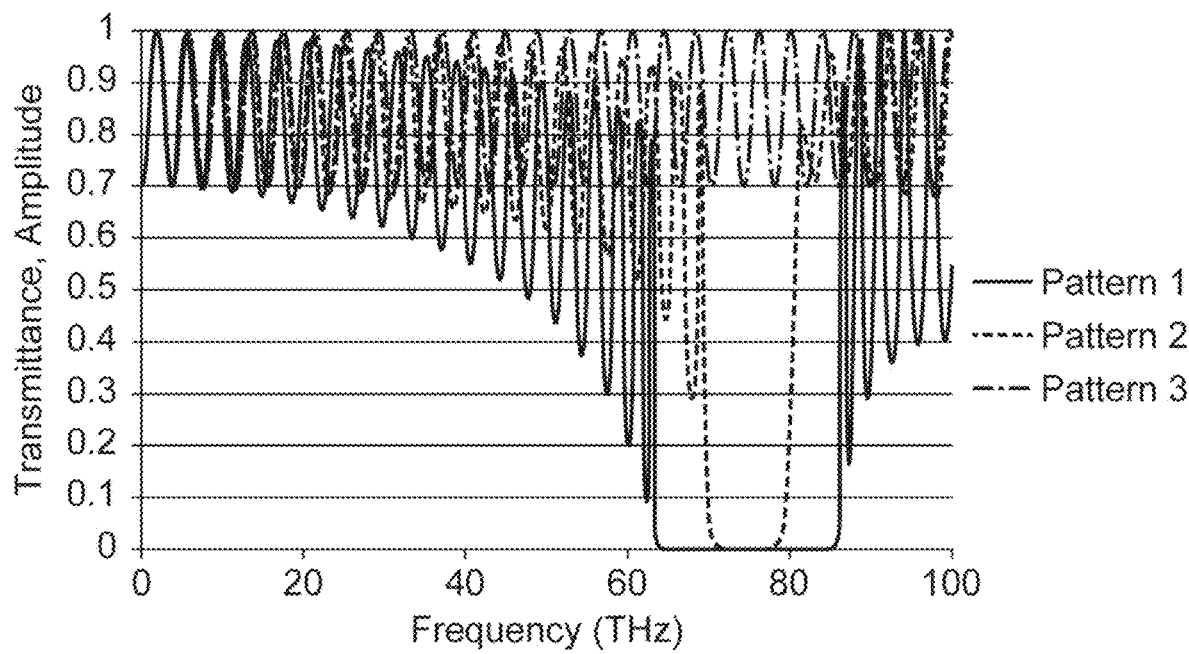
FIG. 8A is a graph showing simulation results.
Figure 8B:
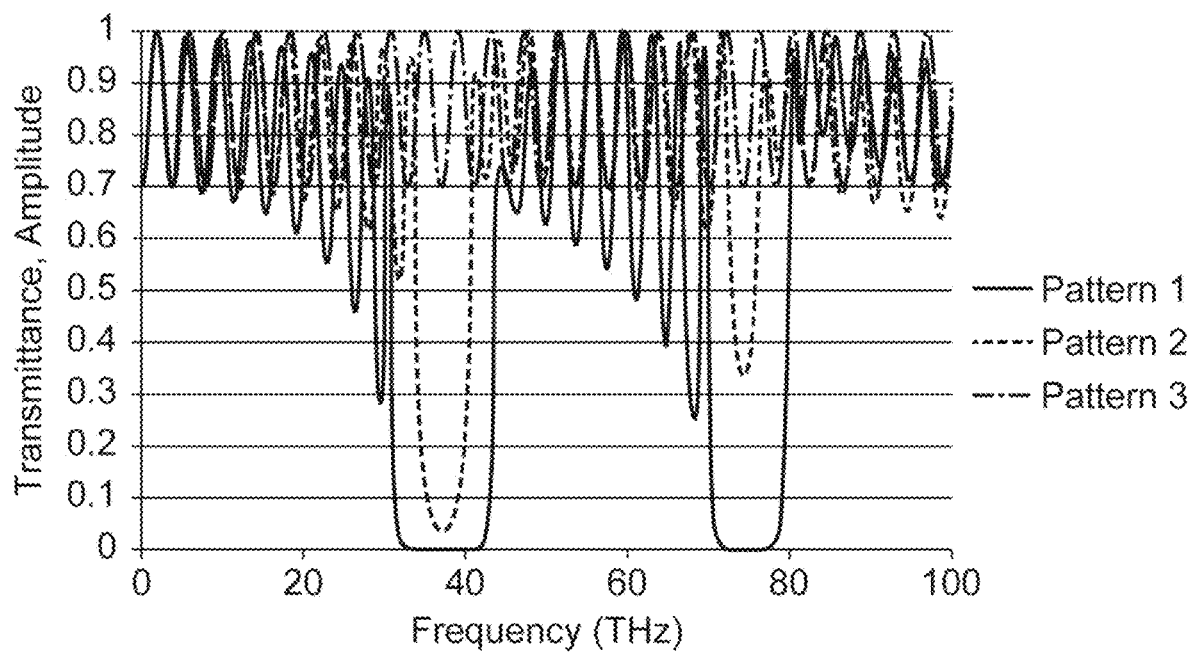
FIG. 8B is a graph showing simulation results.
Figure 9A:
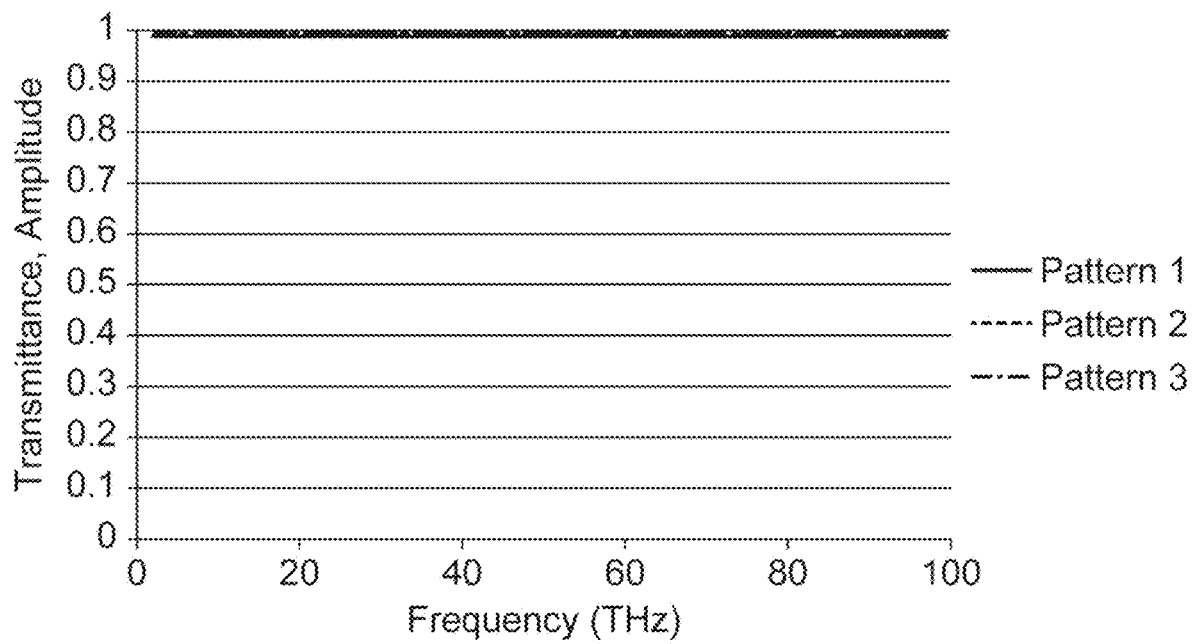
FIG. 9A is a graph showing simulation results.
Figure 9B:
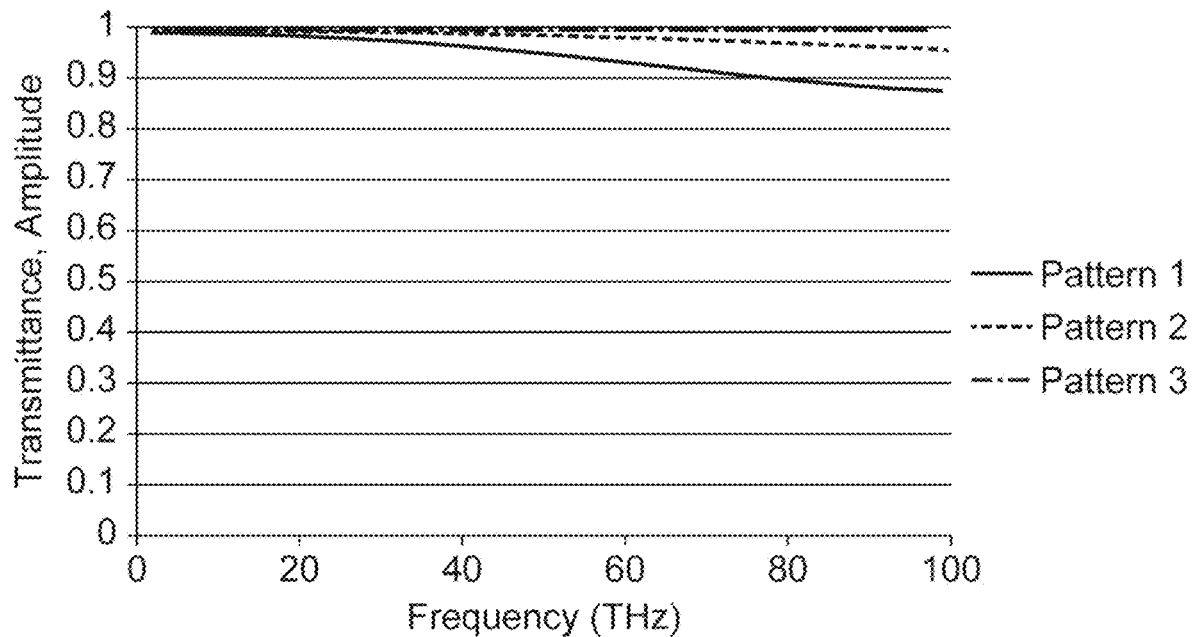
FIG. 9B is a graph showing simulation results.

FIG. 7 to FIG. 10 are graphs showing simulation results. In the graphs in FIG. 7 and FIG. 8, the horizontal axis represents frequency and the vertical axis represents transmittance (amplitude). In addition, the graphs in FIG. 9 and FIG. 10 are obtained by extracting and connecting peak points of vibrations of the graphs in FIG. 7 and FIG. 8. As shown in FIG. 7A and FIG. 9A, when the layer thickness is 100 nm, like the pattern 3, in both the pattern 1 and the pattern 2, the transmittance vibrates in a range of 0.7 to 1 over the entire frequency range. Based on the results, it is found that the first refractive index layer 104 and the second refractive index layer 105 having a layer thickness of 100 nm do not have sensitivity with respect to terahertz waves having a frequency of 0.1 THz to 100 THz, and the pair layer 106 functions as an intermediate refractive index layer. In addition, it can be said that a layer thickness of 100 nm is a thickness that is sufficiently smaller than the wavelength of terahertz waves having a frequency of 0.1 THz to 100 THz.

Figure 7A:
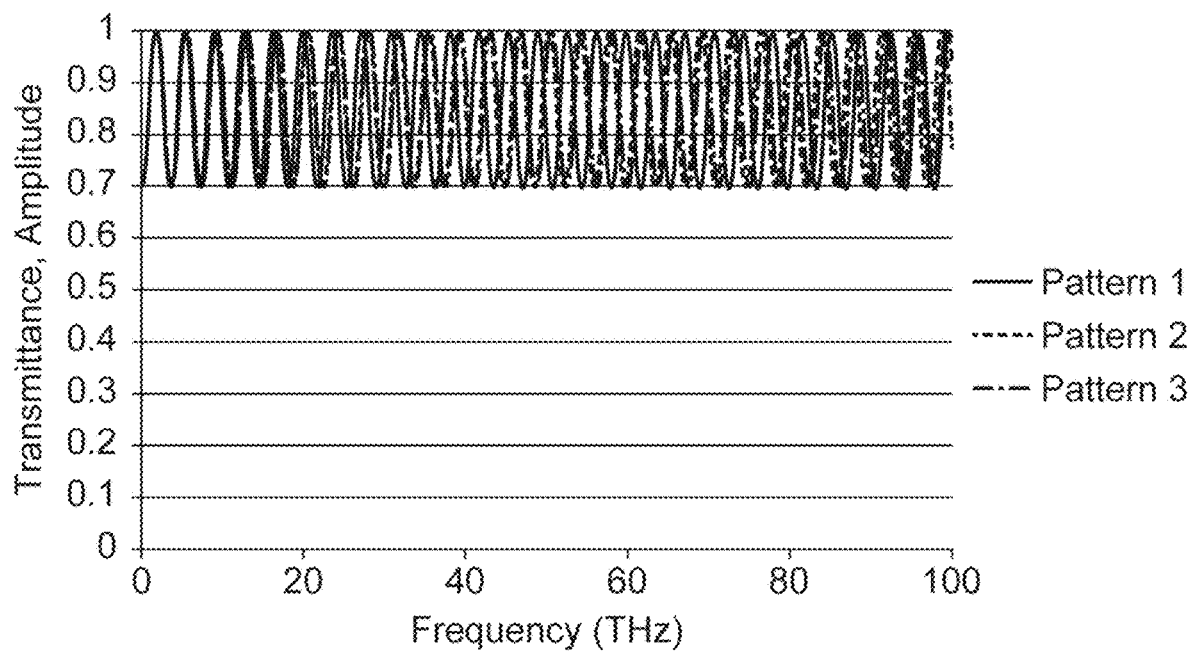
FIG. 7A is a graph showing simulation results.
Figure 7B:
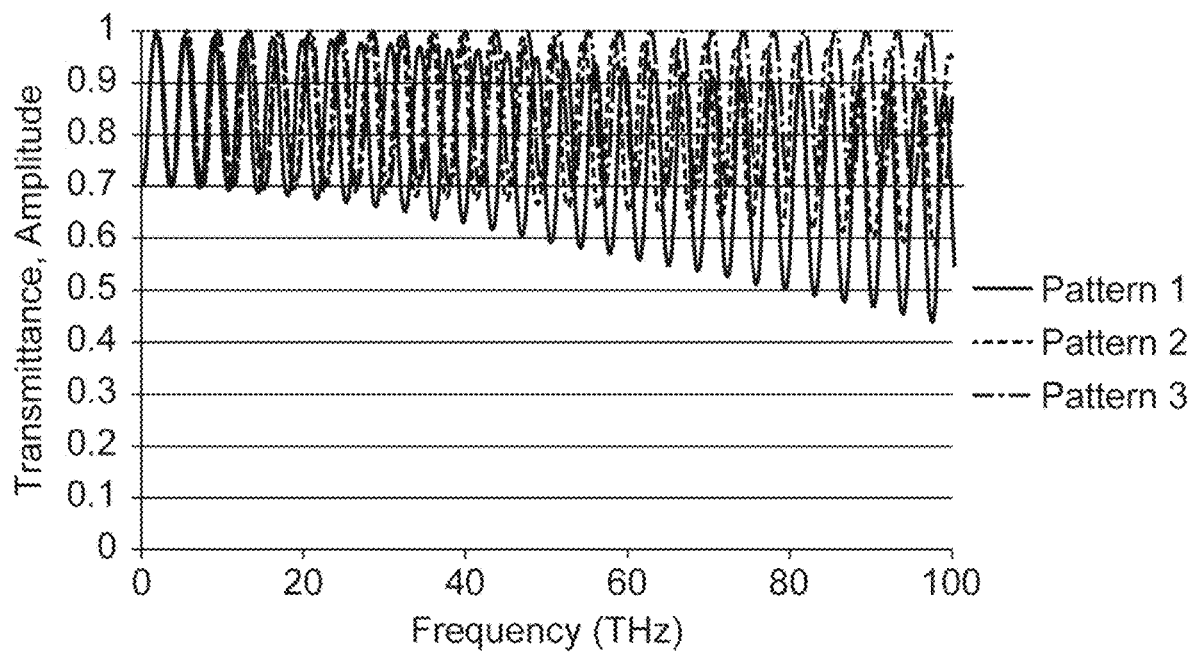
FIG. 7B is a graph showing simulation results.

As shown in FIG. 7B (FIG. 9B), FIG. 8A (FIG. 10A), and FIG. 8B (FIG. 10B), when the layer thickness increases to 250 nm, 500 nm, and 1,000 nm, the graphs of the pattern 1 and the pattern 2 largely deviate from the graph of the pattern 3. When the layer thickness is 500 nm and 1,000 nm, in both the graphs of the pattern 1 and the pattern 2, a dip in which the transmittance drops significantly appears. In addition, the degree of deviation in the graph is larger in the pattern 1 in which the refractive index difference between the first refractive index layer 104 and the second refractive index layer 105 is larger than in the pattern 2 in which the refractive index difference between the first refractive index layer 104 and the second refractive index layer 105 is smaller. Based on the results, it is found that, when the layer thickness increases, the first refractive index layer 104 and the second refractive index layer 105 have sensitivity with respect to terahertz waves having a frequency of 0.1 THz to 100 THz, and the first refractive index layer 104 and the second refractive index layer 105 contribute to reflection of terahertz waves as two independent layers.

Figure 10A:
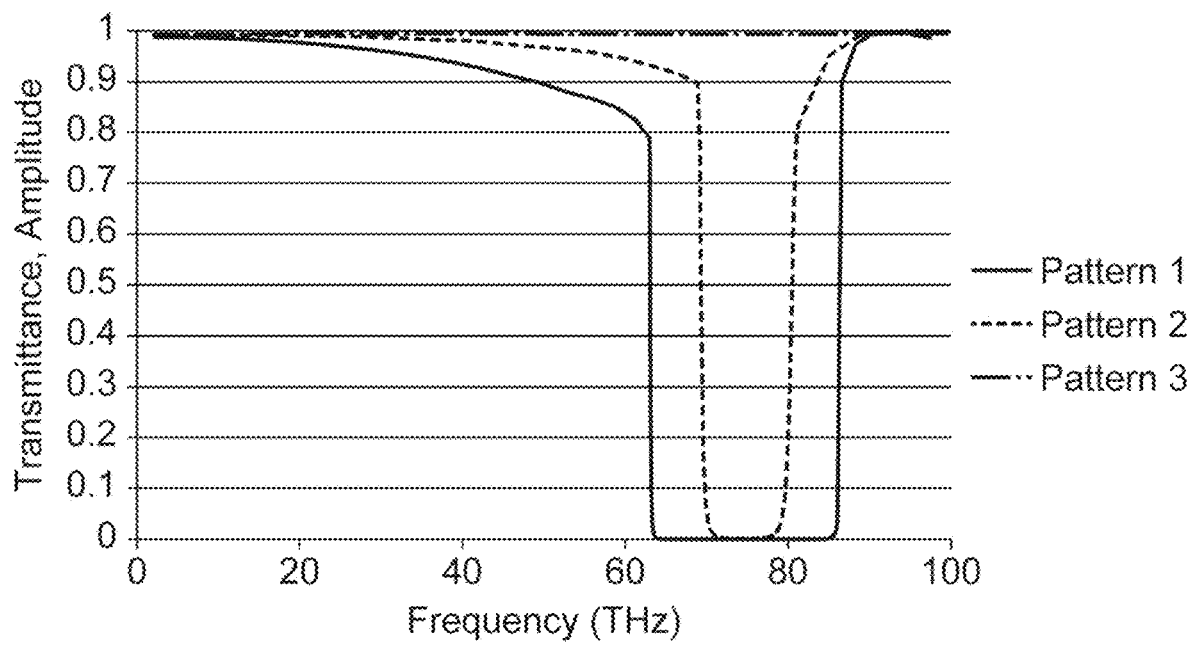
FIG. 10A is a graph showing simulation results.
Figure 10B:
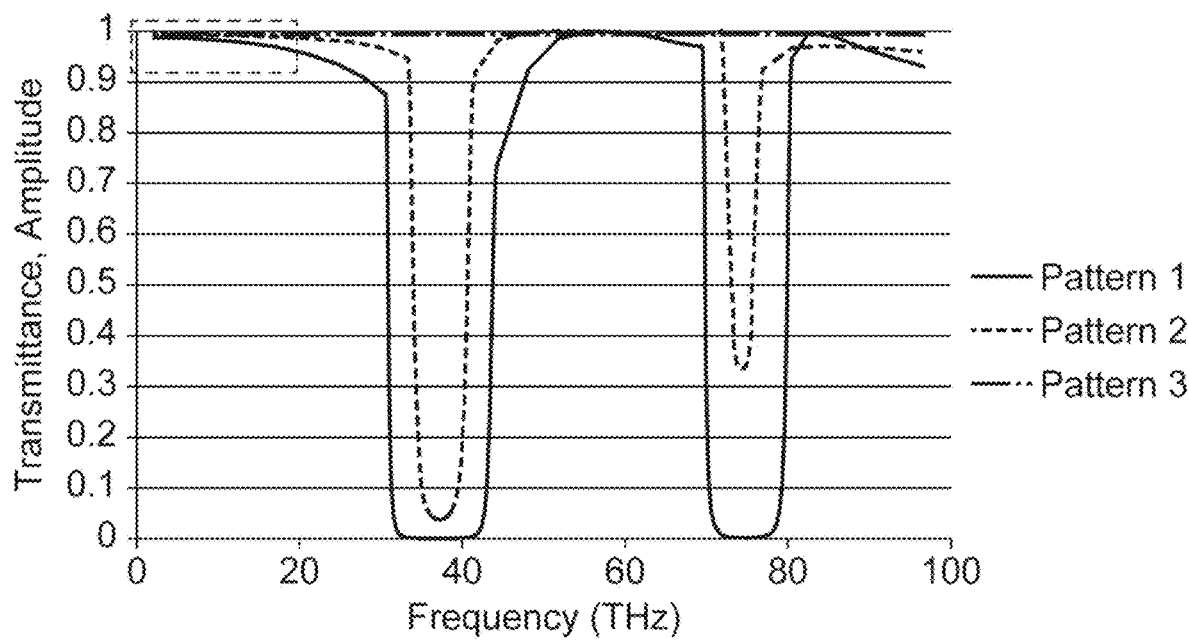
FIG. 10B is a graph showing simulation results.
Figure 11A:
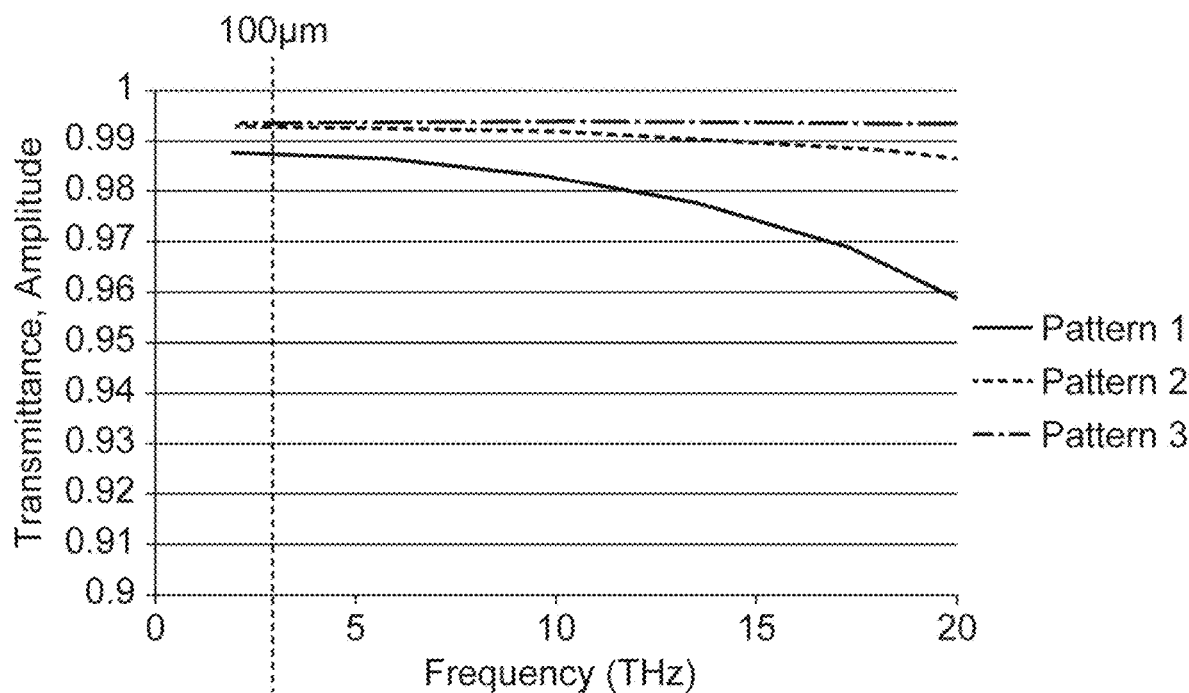
FIG. 11A is a graph showing simulation results.

FIG. 11A shows an enlarged part of a region surrounded by a dotted line in the graph shown in FIG. 10B. In FIG. 11A, a frequency (=3 THz) at which the wavelength of terahertz waves is 100 µm is shown by a dotted line. As shown in FIG. 11A, when the layer thickness is 1,000 nm, in a region having a wavelength of terahertz waves of greater than 100 µm (region having a frequency of 3 THz or less), the deviation of the graphs of the pattern 1 and the pattern 2 from the graph of the pattern 3 is relatively small. In particular, in the pattern 2 in which the refractive index difference between the first refractive index layer 104 and the second refractive index layer 105 is small, the value is almost the same as that of the pattern 3 which is the reference. Therefore, it is found that, when the thickness of the first refractive index layer 104 and the thickness of the second refractive index layer 105 are each ¹⁄₁₀₀ or less of the wavelength of terahertz waves, sensitivity with respect to terahertz waves of the first refractive index layer 104 and the second refractive index layer 105 is sufficiently reduced.

Figure 11B:
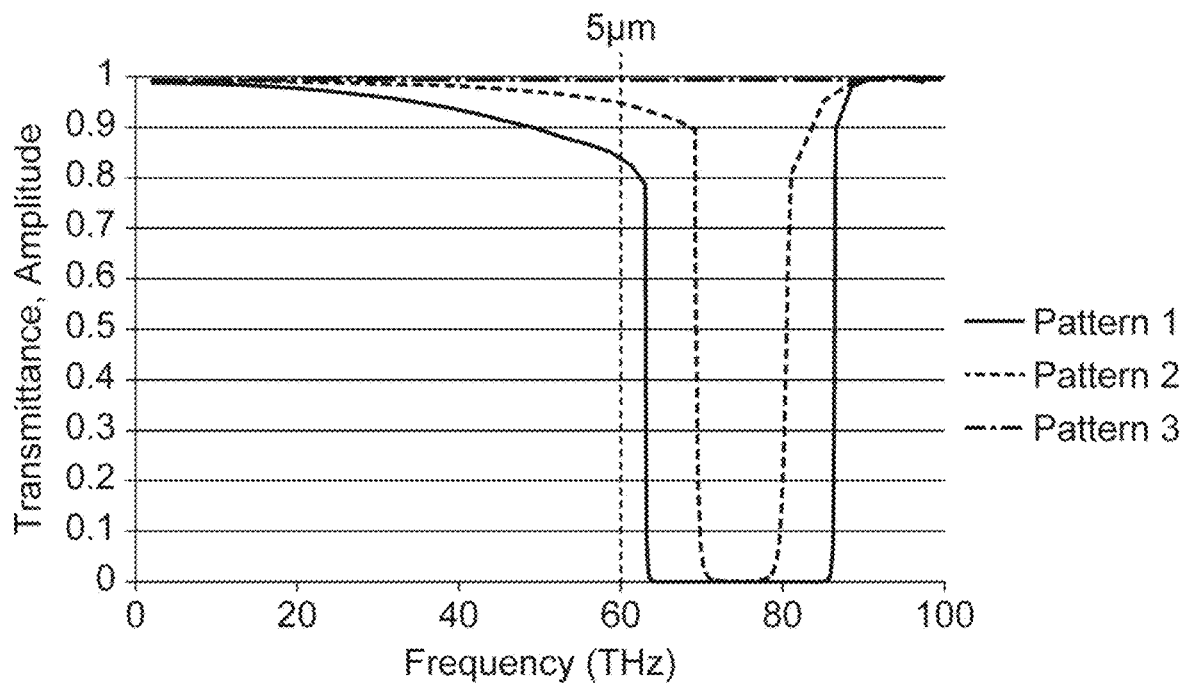
FIG. 11B is a graph showing simulation results.

In addition, FIG. 11B redisplays the graph in FIG. 10A. In FIG. 11B, a frequency (=60 THz) at which the wavelength of terahertz waves is 5 µm is shown by a dotted line. As shown in FIG. 11B, when the layer thickness is 500 nm, in a region having a wavelength of terahertz waves of greater than 5 µm (region having a frequency of 60 THz or less), a dip in which the transmittance drops significantly does not appear, and the deviation of the graphs of the pattern 1 and the pattern 2 from the graph of the pattern 3 is relatively small. Therefore, it is found that, when the thickness of the first refractive index layer 104 and the thickness of the second refractive index layer 105 are each ¹⁄₁₀ or less of the wavelength of terahertz waves, sensitivity with respect to terahertz waves of the first refractive index layer and the second refractive index layer is sufficiently reduced.

What is claimed is:
1. An optical element, comprising:
   a laminate including a first refractive index layer and a second refractive index layer having different refractive indexes for terahertz waves incident on the optical element, the laminate being an anti-reflection film, and the laminate suppresses the reflection of light incident on the optical element; and a main body part configured to support the laminate, wherein the laminate includes a pair layer group in which a plurality of pair layers including the first refractive index layer and the second refractive index layer are laminated, wherein a thickness of the first refractive index layer and a thickness of the second refractive index layer are each 1/10 or less of a wavelength of the terahertz waves incident on the optical element, wherein each of the pair layers has a predetermined effective refractive index for the terahertz waves depending on a thickness ratio between the first refractive index layer and the second refractive index layer, and wherein, in the pair layer group, the effective refractive index of the pair layer for the terahertz waves approaches a refractive index of the main body part for the terahertz waves as the pair layer becomes closer to the main body part.

2. The optical element according to claim 1,
wherein, in the laminate, a plurality of pair layer groups having different effective refractive indexes for the terahertz waves are distributed in a direction intersecting a lamination direction of the pair layers.

3. The optical element according to claim 1,
wherein the thickness of the first refractive index layer and the thickness of the second refractive index layer are each 1/100 or less of the wavelength of the terahertz waves incident on the optical element, and wherein a thickness of the pair layer group is greater than 1/10 of the wavelength of the terahertz waves incident on the optical element.

4. The optical element according to claim 1,
wherein the wavelength of terahertz waves having a frequency of 0.1 THz to 100 THz.

5. An optical element, comprising:
a laminate including a first refractive index layer and a second refractive index layer having different refractive indexes for terahertz waves incident on the optical element, the laminate being an anti-reflection film, and the laminate suppresses the reflection of light incident on the optical element; and a main body part configured to support the laminate, wherein the laminate includes a pair layer group in which a plurality of pair layers including the first refractive index layer and the second refractive index layer are laminated, wherein a thickness of the first refractive index layer and a thickness of the second refractive index layer are each 1/100 or less of a wavelength of the terahertz waves incident on the optical element, wherein a thickness of the pair layer group is greater than 1/10 of the wavelength of the terahertz waves incident on the optical element, wherein each of the pair layers has a predetermined effective refractive index for the terahertz waves depending on a thickness ratio between the first refractive index layer and the second refractive index layer, and wherein, in the pair layer group, the effective refractive index of the pair layer for the terahertz waves approaches a refractive index of the main body part for the terahertz waves as the pair layer becomes closer to the main body part.

6. The optical element according to claim 1,
wherein the thickness of the first refractive index layer and the thickness of the second refractive index layer are 100 nm to 1000 nm.

* * * * *